United States Patent [19]
Frost et al.

[11] 3,954,234
[45] May 4, 1976

[54] SINGLE POINT GROUND EMERGENCY SEAT RESTRAINT DIVESTMENT SYSTEM

[75] Inventors: Richard H. Frost, Littleton; Ronald Criley, Lake City, both of Colo.

[73] Assignee: Frost Engineering Development Corporation, Englewood, Colo.

[22] Filed: Sept. 25, 1974

[21] Appl. No.: 509,253

[52] U.S. Cl. .......................... 244/151 A; 24/73 PH; 24/230 A; 74/2; 244/122 B; 285/190
[51] Int. Cl.² ...................................... B64D 17/30
[58] Field of Search ........ 244/151 R, 151 A, 122 R, 244/122 A, 122 B, 122 AG, 122 AH, 141; 24/73 PH, 230 A, 230 AV, DIG. 26; 285/33, 190, DIG. 21; 74/2; 102/27 R

[56] References Cited
UNITED STATES PATENTS

| | | | |
|---|---|---|---|
| 3,032,299 | 5/1962 | Martin | 244/141 X |
| 3,270,387 | 9/1966 | Ziegler et al. | 244/151 A |
| 3,597,919 | 8/1971 | Lilly | 102/27 R X |
| 3,658,281 | 4/1972 | Gaylord | 24/230 A X |
| 3,767,143 | 10/1973 | Gaylord | 244/151 A |
| 3,785,597 | 1/1974 | Gaylord | 244/151 A |

FOREIGN PATENTS OR APPLICATIONS

| | | | |
|---|---|---|---|
| 844,618 | 8/1960 | United Kingdom | 244/151 R |

*Primary Examiner*—Trygve M. Blix
*Assistant Examiner*—Barry L. Kelmachter
*Attorney, Agent, or Firm*—Burton, Crandell & Polumbus

[57] ABSTRACT

A restraint divestment system for releasing a crewman equipped with a parachute and restraint harness from an aircraft ejection seat mounted restraint assembly in the event of a ground emergency. A single point crewman actuated mechanism releases the leg restraints, seat lap belt, and the disconnect couplings connecting the parachute riser and shoulder straps and survival kit to the harness so that, in the event of a ground emergency, the crewman can escape from the aircraft with his harness. The actuating mechanism includes an interlock which prevents release of the parachute risers and survival kit in the event of an emergency ejection from the aircraft when in-flight, so that the system can then be utilized by a crewman for manual seat separation and parachute descent. The actuating mechanism includes a pull cord actuated bell crank mechanism which actuates the various release mechanisms and is latched in its full release position. The parachute riser disconnect couplings and the survival kit disconnect couplings are actuated by rapid deflagrating cord, and the cord system includes quick release pull away swivel fittings allowing the rapid deflagrating cords to be separated quickly from the ejection seat.

12 Claims, 15 Drawing Figures

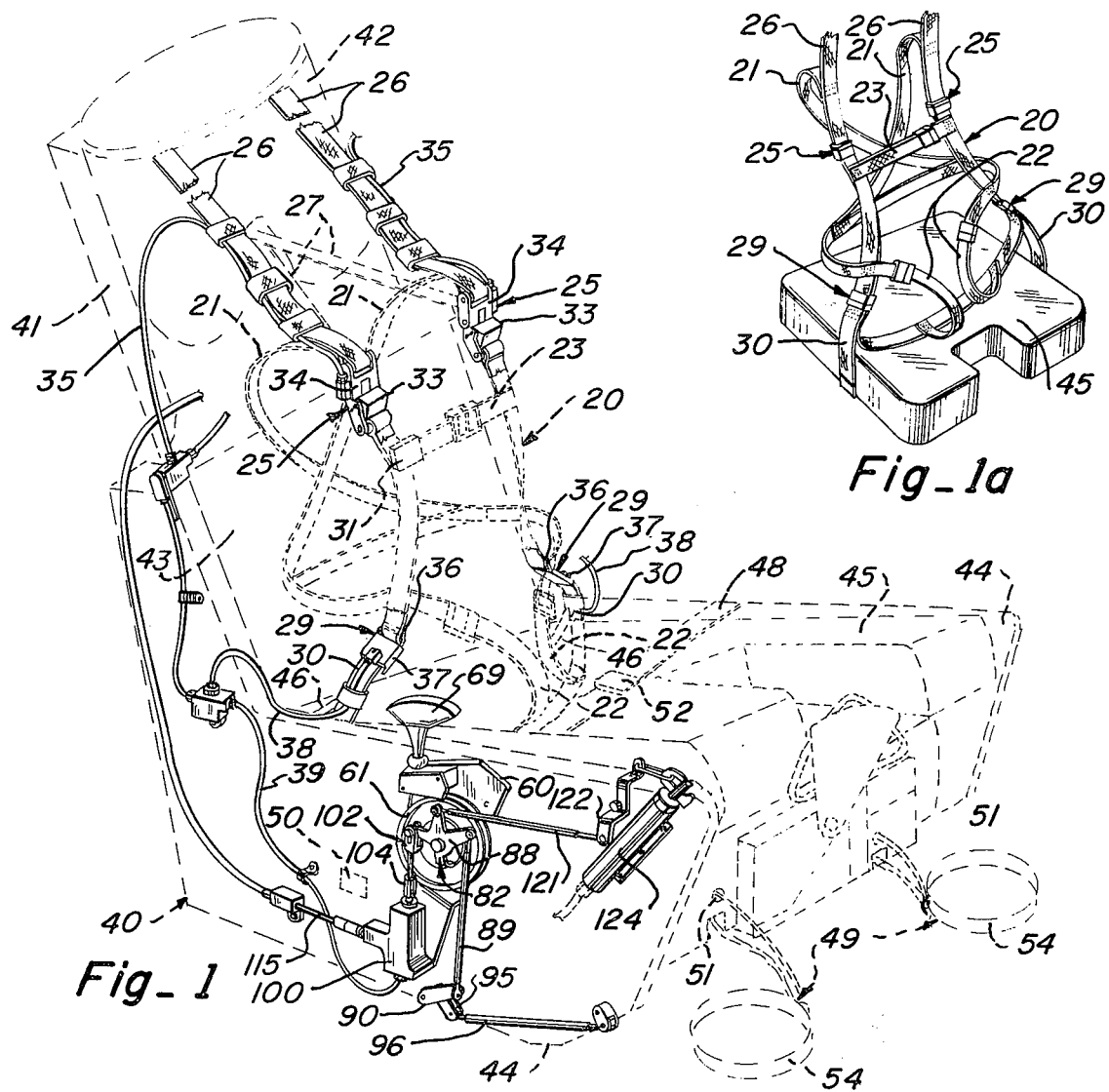
Fig_1
Fig_1a
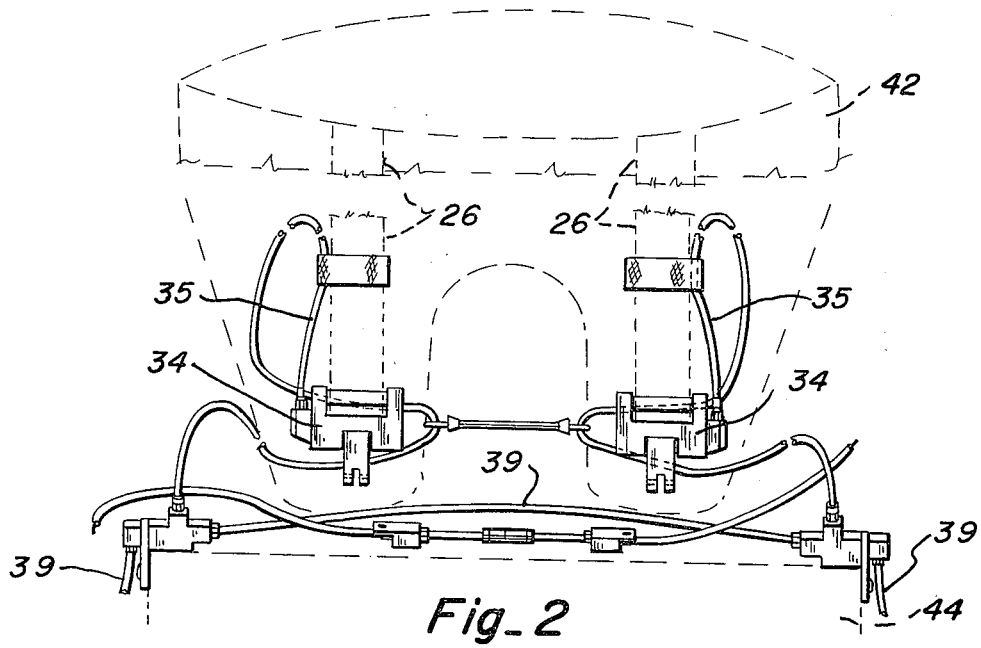
Fig_2

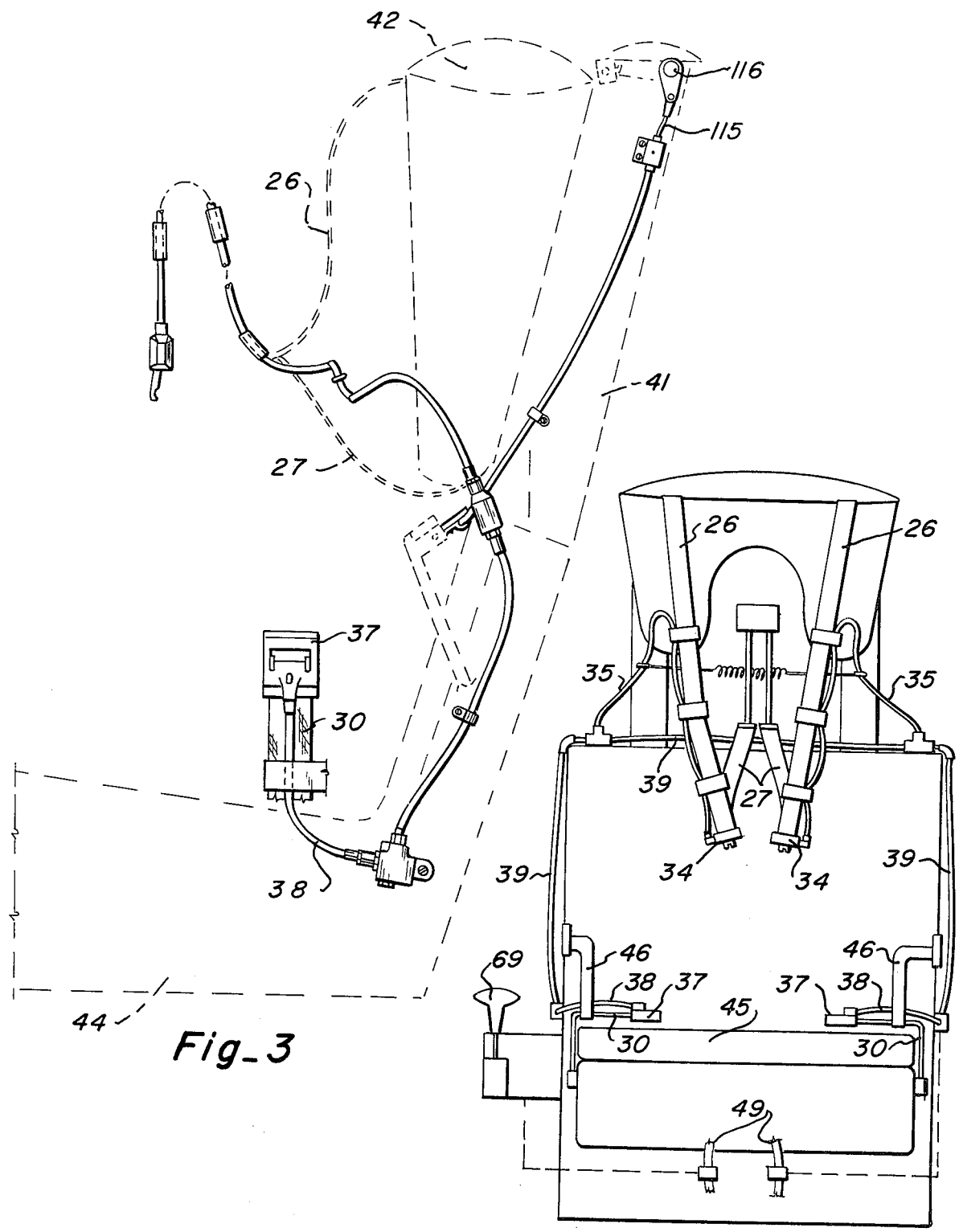
Fig_3
Fig_4

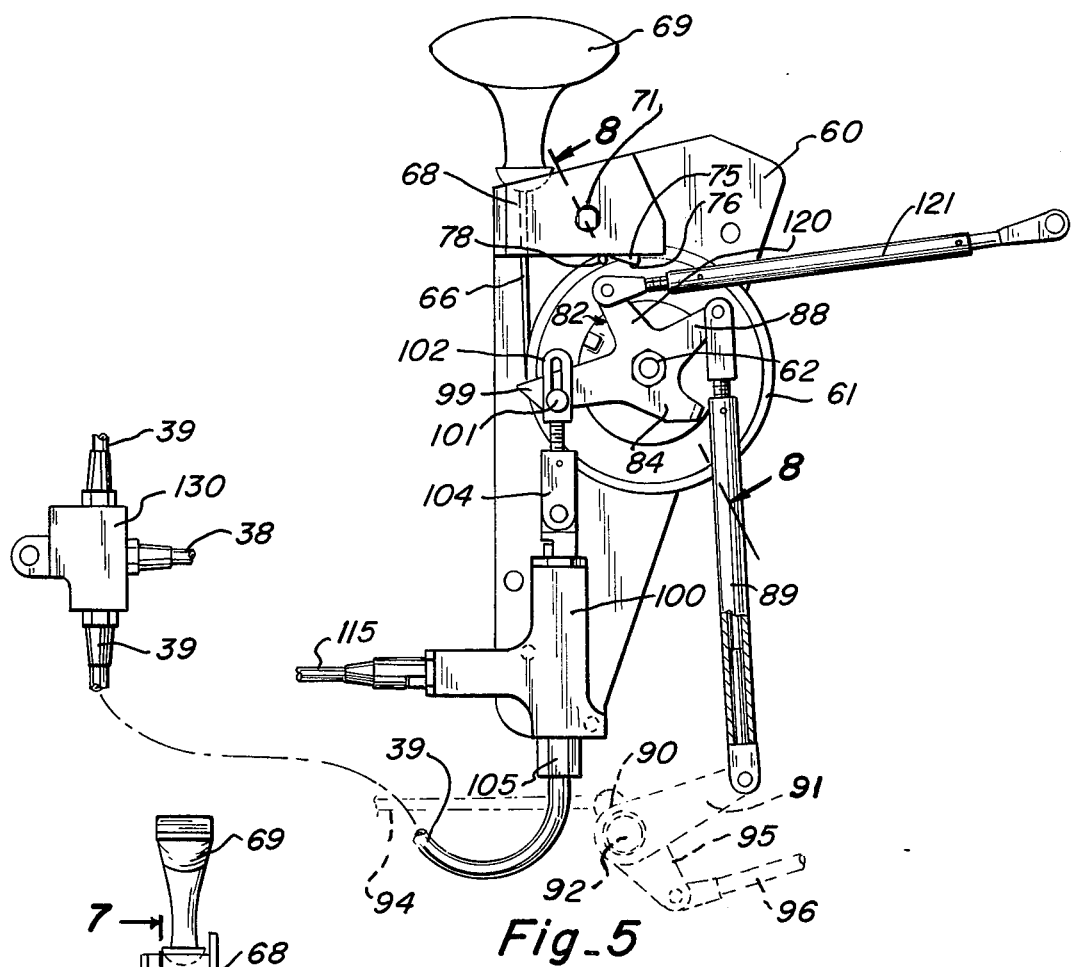
Fig_5
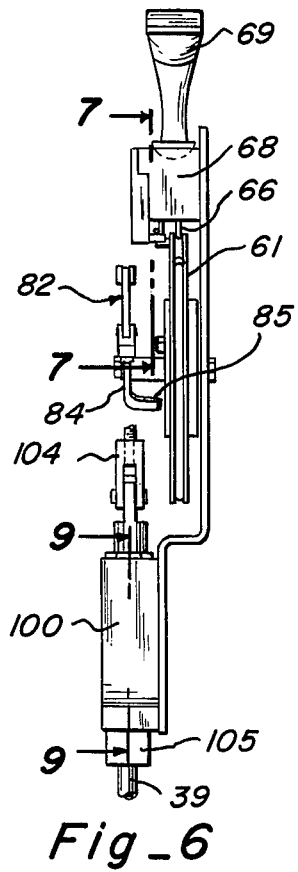
Fig_6
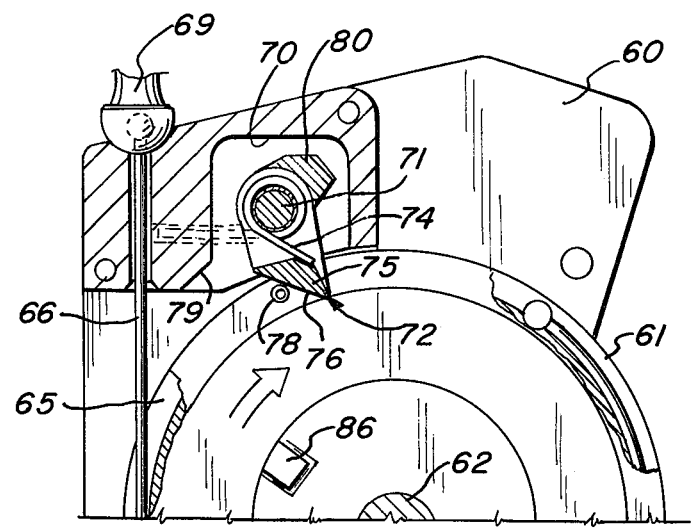
Fig_7

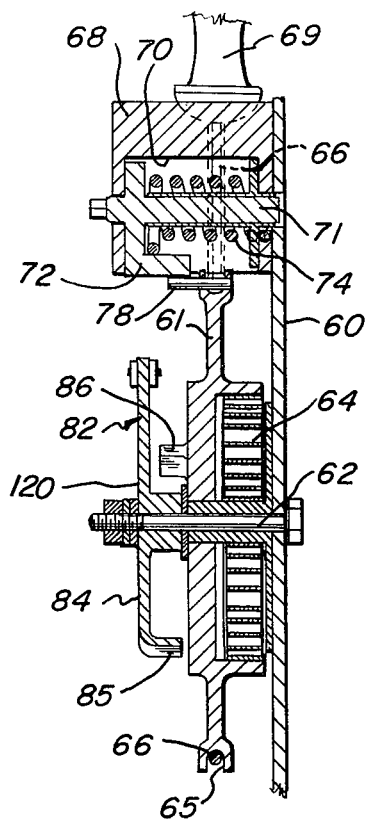
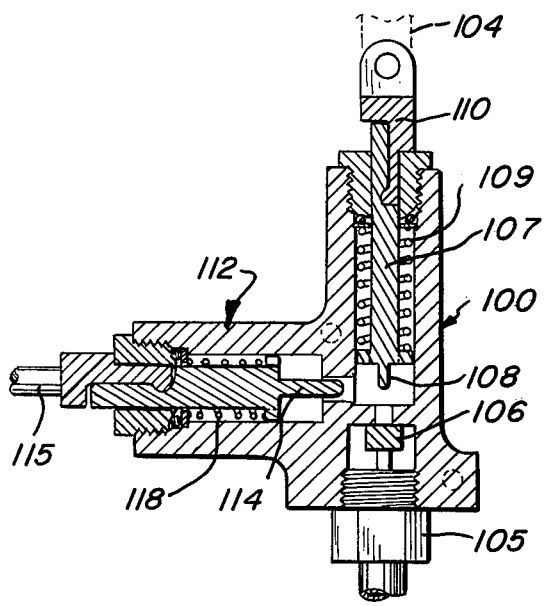
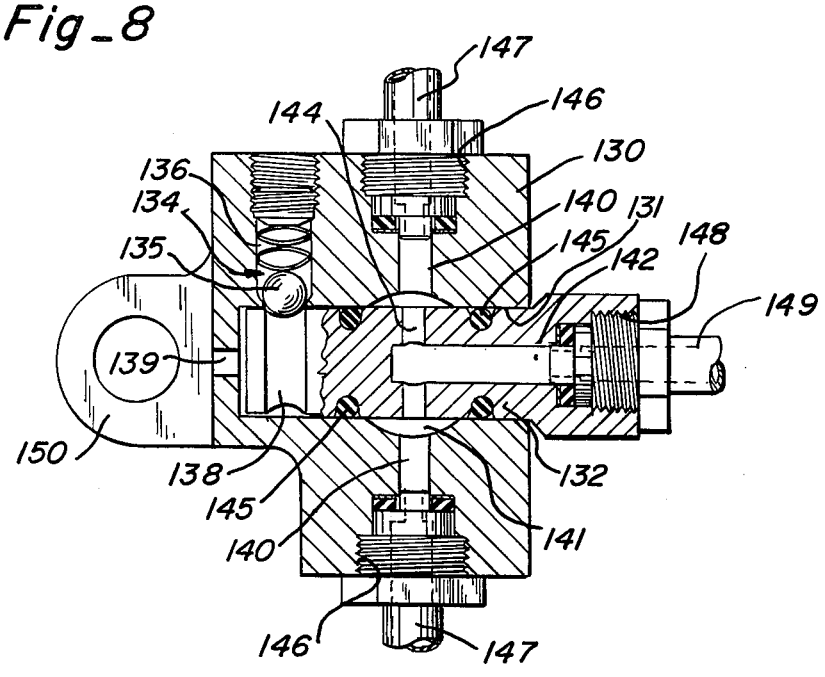
Fig_8
Fig_9
Fig_10

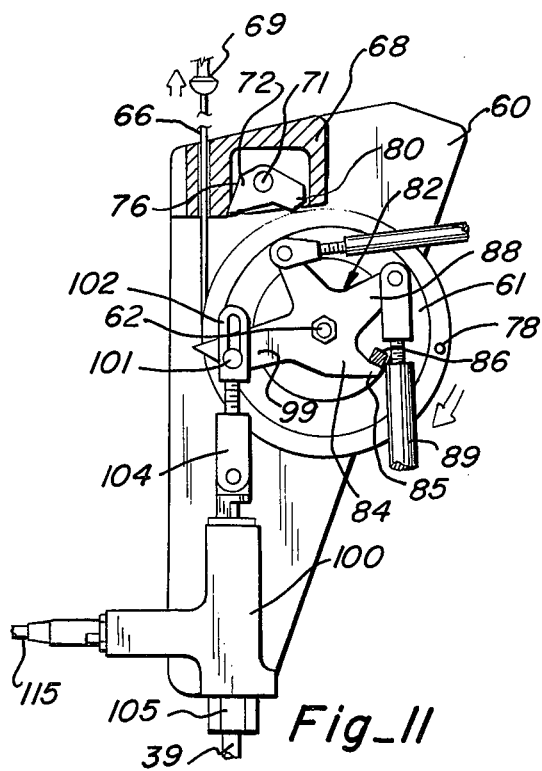
Fig_11
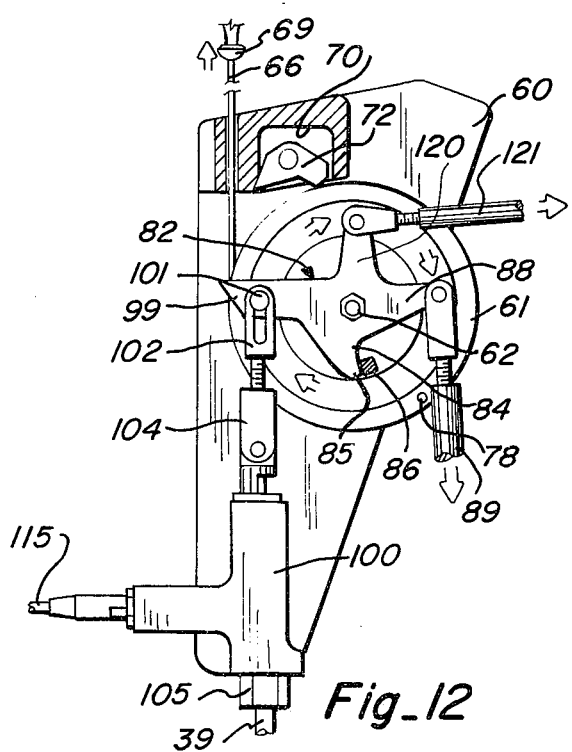
Fig_12
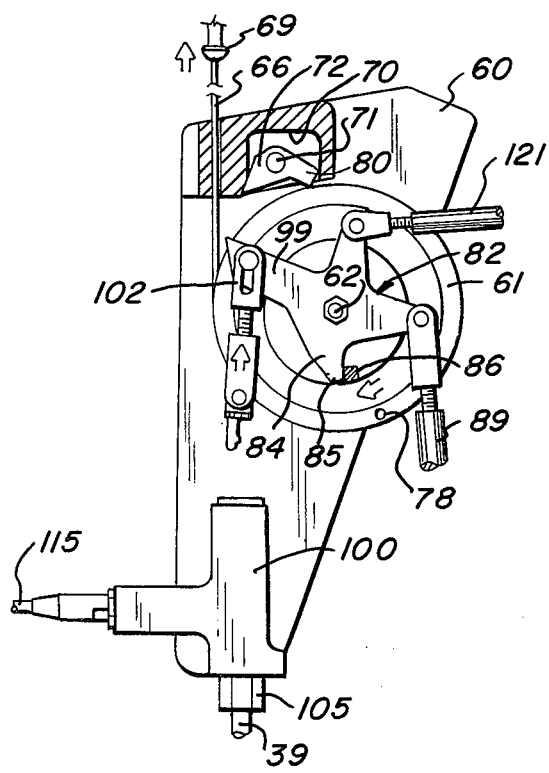
Fig_13
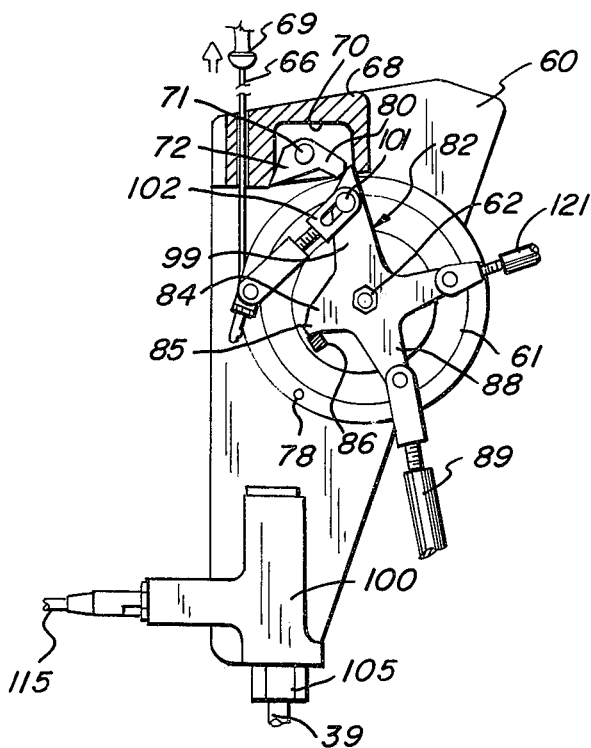
Fig_14

SINGLE POINT GROUND EMERGENCY SEAT RESTRAINT DIVESTMENT SYSTEM

The invention described herein was made in the course of or under a contract or subcontract thereunder with the U.S. Department of Defense.

FIELD OF THE INVENTION

The present invention relates to restraint systems finding principal but not necessarily exclusive utility in connection with aircraft ejection seats, and more particularly to ejection seat restraint systems which incorporate crewman operated divestment features for use in the event of a ground emergency requiring the crewman to evacuate the aircraft in an extremely short time span after initially engaging the restraint system.

For a detailed description of the structure, function and operation of an illustrative ejection seat mechanism and an illustrative parachute harness with which the present invention is utilized, reference should be made to United States Air Force Flight Manual T.O. 1F-4C-1, Aug. 1972, Change 2 Feb. 26, 1973, "USAF Series F-4C, F-4D, and F-4E Aircraft," pages 1-67 through 1-75, 3-15 through 3-23, and FO-21, and to United States Air Force Technical Manual — Maintenance Instructions T.O. 1F-4C-2-3, Apr. 1, 1972, Change 1 — Apr. 1, 1973, "Seat and Canopy Systems, USAF Series F-4C Aircraft," pages 4-1, et seq. To the extent necessary for a complete understanding of the ejection seat and adjunct equipment these manuals are incorporated herein by reference.

This invention utilizes in part the gas operated quick disconnect coupling disclosed in R.H. Frost, U.S. Pat. application Ser. No. 321,514 filed Jan. 5, 1973, now U.S. Pat. No. 3,872,556, issued Mar. 25, 1975, for "GAS OPERATED QUICK DISCONNECT COUPLING" the disclosure of which is incorporated herein by reference.

BACKGROUND OF THE INVENTION

An aircraft crewman, particularly in military aircraft, is equipped with a variety of restraint, recovery and life support systems which are principally utilized while the aircraft is in flight and in the event of the necessity for an emergency evacuation, particularly at high altitudes from fast moving aircraft. The crewman conventionally wears a harness which fits over his back and shoulders with a chest strap connecting the upper portion of the shoulder straps and leg straps which wrap around the legs and thighs of the wearer. Such a harness commonly referred to as a parachute harness, additionally supports terminals for oxygen and communication systems, as well as coupling devices for securing to the harness parachute canopy risers, shoulder restraint straps and survival kit straps. The survival kit conventionally is contained in the seat portion of the aircraft seat structure and, by being secured to the crewman's parachute harness, is retained by him in the event of an emergency evacuation by seat ejection, followed by a parachute landing. Also included in the restraint system is a conventional seat or lap belt together with leg restraints securing the crewman's legs to the seat structure, and sticker clip straps which releasably secure the survival kit to the seat structure.

In the event of an emergency evacuation while the aircraft is in flight, the entire ejection seat and restraint system, including the parachute and survival kit is power ejected from the aircraft. At an appropriate time after the seat is safely away from the aircraft, and the crewman and seat unit is at or has descended to a safe altitude, the seat restraints are automatically disengaged allowing the crewman to descend safely by means of the parachute secured to the shoulder straps of his harness and carrying with him the survival kit secured to the harness. Life support systems, particularly emergency oxygen, are carried with the ejection system and are coupled to the crewman's helmet and oxygen mask through the harness mounted coupling system.

As an added safety feature, in the event the automatic seat restraint disengagement procedures are not accomplished, the aircraft seat conventionally includes a manually actuated device for releasing the seat and leg restraints allowing the seat to fall away so that the crewman can pull his ripcord and descend by parachute.

After a parachute landing, under some circumstances it is desirable for the person to quickly divest himself of the parachute harness. To this end parachute harness release systems have been designed, an illustrative one of which is shown in U.S. Pat. No. 3,658,281 issued Apr. 25, 1972, to J.A. Gaylord for "Single Release For Parachute Harness." The Gaylord system releases the complete parachute harness, including the survival kit carried thereby, and is intended for divestment of the complete parachute harness after landing from an emergency evacuation from a moving aircraft and parachute descent. Once safely on the ground, the wearer usually discards the parachute harness. Therefore, there is no need in the Gaylord structure to disconnect the survival kit from the harness proper. Further, there is little if any need for a harness release system which can be quickly reconnected should the crewman decide that he wishes to retain and wear the harness.

It will be appreciated that once a crewman has positioned himself in an aircraft, engaged his harness with his oxygen, communication and life support systems, engaged the seat shoulder straps and parachute risers, engaged the seat lap belt and leg restraints, and engaged the survival kit straps, he is effectively integrated into and fully restrained within the aircraft cockpit. There is still, however, a substantial danger, particularly for combat aircraft, of fire or other emergency occurring during start-up or after landing and while the aircraft is on the ground, necessitating immediate evacuation by the crewman from the aircraft. While under some circumstances it is possible to initiate the ejection seat while the aircraft is on the ground, the risk of injury by utilizing that procedure is substantial.

OBJECTS OF THE INVENTION

It is the principal object of the present invention to provide a new and improved single point control ground emergency seat restraint divestment system which will increase the speed of crew escape and rescue from aircraft cockpits in ground emergencies. A related object is to provide such a system which can be installed and utilized without substantial change in existing equipment and procedures presently utilized for engaging or disengaging parachute, seat restraint, survival kit, oxygen, communication and life support systems.

Another object of the present invention is to provide a ground emergency seat restraint divestment system of the foregoing character which is mounted entirely on an aircraft seat and seat related accessories, which does not affect routine procedures for coupling to or disengagement from the crewman borne harness, and which includes safety interlocks to prevent actuation of the parachute and survival kit releases in the event of ejection from an aircraft in flight.

A further object of the present invention is to provide a ground emergency seat restraint divestment system of the foregoing type which is safe and reliable in operation, simple to install and utilize, is economical and facilitates ease of field installation. More specifically, it is an object of the invention to provide a system of the foregoing character which utilizes in substantial part the existing fittings and equipment available on aircraft ejection seats, parachute equipment and the like.

A more specific object is to provide a ground emergency restraint divestment system which requires a single motion activation, precludes inadvertent actuation, and does not compromise parachute and restraint system integrity.

A further object of the present invention is to provide a system of the foregoing character which permits reconnection of the power actuated release devices, does not interfere with manual release, and which resists abuse and accidental actuation.

Other objects and advantages of the present invention will become apparent from the following description of the preferred embodiment taken in conjunction with the accompanying drawings.

SUMMARY OF THE INVENTION

In accordance with the foregoing objects, the present invention contemplates a restraint divestment system for releasing a crewman equipped with a parachute and restraint harness from an aircraft ejection seat and seat mounted restraining assembly in the event of a ground emergency. After entering the aircraft cockpit and connecting the various restraint systems, it is desirable that the systems be releasable by a single manipulation of a release mechanism so that the crewman may escape from the aircraft rapidly in the event of a ground emergency. To this end the couplings between the crewman's harness and the parachute risers, shoulder restraints and survival kit are formed of quick disconnect couplings. The seat mounted release devices for the lap belt and leg restraints are utilized. All of the release mechanisms are actuated from a single point by a pull cord operated bell crank device having various bell crank arms connected to initiating devices for releasing the restraints. Appropriate lost motion connections are utilized so that the restraints are sequentially actuated thereby reducing the force of the pull required on the pull cord, and effecting actuation of the various release devices in the desired sequence.

The quick disconnect couplings connecting the crewman's harness to the parachute riser and shoulder restraints as well as the survival kit straps are actuated by any suitable positive pressure source such as hot gas rapid deflagrating cord. The cord sections leading to the harness connected disconnect couplings are coupled to the ejection seat by appropriate pull away swivel fittings. In the event of an ejection from a moving aircraft without actuation of the harness divestment system, the cords are readily pulled away from the seat allowing a free and clear separation between the seat and the crewman for parachute descent. An interlock is also provided between the pull cord actuating mechanism and the rapid deflagrating cord firing device to prevent actuation of the firing device in the event of an in-flight ejection. The restraint divestment system and adjunct equipment thus afford a high safety factor allowing immediate escape from the aircraft in the event of a ground emergency as well as adapting the system for use in separation from the seat without disconnecting the parachute or survival kit in the event of an emergency escape from a moving aircraft.

The restraint divestment system embodying the present invention is mounted entirely on the ejection seat and its accessories. Accordingly, neither the crewman's harness nor the oxygen hose fittings nor the routine procedures for coupling the crewman to or releasing him from his seat and equipment is affected or encumbered in any way by the restraint divestment system embodying the present invention. The system is safe, reliable and readily adaptable for field installation. When installed it affords minimum time ground escape as well as capability of seat separation during parachute descent. In neither ground escape nor in-flight ejection is the crewman divested of his harness. Safely interlocks are provided to prevent divestment of the parachute harness and survival kit in the event of an inflight ejection. The system can be readily adapted for use with a wide variety of ejection seat and harness systems.

DESCRIPTION OF THE DRAWINGS

FIG. 1 is an isometric view illustrating the restraint divestment system embodying the present invention in relationship with an aircraft ejection seat and harness.

FIG. 1a is an isometric view illustrating diagramatically a parachute harness with a survival kit and portions of parachute canopy risers secured thereto.

FIG. 2 is a front view of the upper portion of the assembly shown in FIG. 1.

FIG. 3 is a left-hand side view of a portion of the assembly shown in FIGS. 1 and 2.

FIG. 4 is a front view, partially schematic, of the assembly shown in FIGS 1 and 2.

FIG. 5 is an enlarged elevation view of the single point control release mechanism forming a part of the assembly shown in FIG. 1.

FIG. 6 is a front elevation view of the mechanism shown in FIG. 5.

FIG. 7 is an enlarged section view taken substantially in the plane of line 7—7 on FIG. 6.

FIG. 8 is an enlarged section view taken substantially in the plane of line 8—8 on FIG. 5.

FIG. 9 is an enlarged section view taken substantially in the plane of line 9—9 on FIG. 6.

FIG. 10 is a section view of a quick disconnect fitting for use with pressure conduit such as rapid deflagrating cord.

FIG. 11 is a view similar to that of FIG. 5 but with the pull cord pulled to the end of the lost motion stroke.

FIG. 12 is a view similar to FIG. 11 but showing the mechanism after further movement of the pull cord.

FIG. 13 is a view similar to that of FIG. 11 but showing the mechanism after a still further movement of the pull cord.

FIG. 14 is a view similar to that of FIG. 11 but showing the mechanism after the pull cord has been pulled to its full extent.

DESCRIPTION OF THE PREFERRED EMBODIMENT

The present invention constitutes a restraint divestment system for releasing a crewman equipped with a parachute and restraint harness from an aircraft ejection seat. While portions of one illustrative ejection seat and harness have been shown in the drawings, and will be described briefly, such equipment is shown in substantial detail in the above-referenced manuals. Moreover, the particular seat and harness structures may vary according to the particular aircraft or equipment manufacturer's specifications. In general, the harness is basically intended as a parachute harness for supporting the crewman in the event of an in-flight ejection or bailout from the aircraft. The harness does, however, serve for attachment of upper torso restraints, including inertia reel connected shoulder straps, and to support a survival kit for the crewman's use after landing from a bailout, and in addition supports connections for his oxygen mask system and possibly for communication and life support systems.

The ejection seat may also take a variety of forms, depending upon the particular manufacturer. Essentially, the seat both supports the crewman during flight and serves as his means of emergency egress from the aircraft in an in-flight emergency. In such event, the entire seat carrying the crewman and his parachute is ejected from the aircraft by catapult, usually augmented by rocket propulsion. At an appropriate time after ejection, such as when the seat and crewman have descended to a safe altitude, the seat automatically separates from the man and his parachute, the parachute opens and he is lowered safely to the ground. In the event the seat separation system does not function properly, the seat contains a manual release mechanism which can be activated so that the man can separate himself from the seat and manually actuate the parachute ripcord mechanism.

Referring to FIG. 1 of the drawings, an illustrative ejection seat and parachute harness and survival kit are there shown in the juxtaposed configuration normally encountered when a crewman is seated in the aircraft cockpit and has engaged the various restraints in preparation for takeoff. The harness, indicated generally at 20, is formed by shoulder strap portions 21 which extend up the back and over the shoulders of the wearer, and leg portions 22 which extend down the back from the shoulder portions and around the thighs to a point on the front of the torso where they connect with the shoulder strap portions. A chest strap 23 connects the two shoulder portions 21. At a point above the chest strap 23, the shoulder straps 21 of the harness are connected by fittings 25 to parachute riser straps 26 and seat mounted shoulder restraints 27. At a point on the harness adjacent to the terminals of the leg straps 22 the harness is connected by fittings 29 to survival kit straps 30. The harness 20 may also carry an oxygen supply fitting 31 through which the crewman connects his oxygen mask hose (not shown) by means of a bayonet fitting and to which is connected both the main aircraft oxygen hose (not shown) and the emergency oxygen hose (not shown), which hoses are in turn connected with the aircraft and emergency oxygen supply respectively with readily releasable friction fittings (not shown) in a conventional manner.

In the event of a ground emergency, it is generally desirable for the crewman to retain his harness as he scrambles for the cockpit. If an emergency escape system provides for separating the harness, there is always the danger that the harness will remain connected to the oxygen mask and thus become a drag on the man as he leaves the cockpit. A harness release system which severs or otherwise releases the harness straps so that a man may divest himself of his parachute after having safely landed following an ejection may, however, be incorporated on the harness and would serve as a backup system to the system embodying the present invention.

The shoulder harness and parachute riser fittings 25 are preferably of the type shown in co-pending application Ser. No. 321,514, referred to above. Such fittings are known as quick disconnect couplings and include a manually releasable female section 33, shown in the drawings mounted on the shoulder strap portion 21 of the harness 20, and a power releasable male section 34 coupled to the parachute riser 26 and shoulder restraint strap 27. An illustrative power releasable male fitting section 34 is described in detail in the above-mentioned co-pending application, and as described in said application, is actuated by fluid pressure, preferably by a hot gas energy transfer system, commonly known as a rapid deflagrating cord, one form of which is available commercially under the trademark "Hivelite" from Teledyne McCormick Selph Company of Hollister, California. Igniting the cord material at one end causes an almost instantaneous burning of the deflagrating material contained by the cord to ignite a boost charge at the terminals to produce sufficient hot gas pressure to disconnect the coupling at the male member 34. Rapid deflagrating cord thus finds particular utility where it is necessary that it be actuated at a point remote from the location at which it is desired to obtain work from the hot gas, and yet achieve almost instantaneous action at the work point. Alternative pressure producing systems may be used to advantage without departing from the present invention.

The survival kit fittings 29 are also quick disconnect couplings, but utilize as the male portion a ring, such as a V-ring 36, secured to the harness on each side thereof adjacent the leg straps 22. The V-ring latch members 36 couple with quick disconnect female couplings 37 secured to the survival kit straps 30. The quick disconnect coupling members 37 are also actuated by a suitable remote source mechanism such as rapid deflagrating cord 38 connected thereto. Both the rapid deflagrating cord transfer lines 35 to actuate the shoulder harness and parachute riser fittings 34 and the rapid deflagrating cord transfer lines 38 to the survival kit fittings 37 may in turn be actuated from a master cord 39 connected thereto by appropriate fittings which will be described in somewhat more detail below, so that all of the quick disconnect couplings are actuated substantially simultaneously upon the ignition of the master cord 39 by an appropriate firing charge.

The aircraft seat, indicated generally at 40, serves the dual function of supporting and retaining the crewman during flight operation as well as an escape system for emergency ejection from the aircraft. The seat 40, which will sometimes be referred to as an ejection seat, is described in detail in the above-referenced manuals. Referring to FIG. 1 of the drawings, the ejection seat 40 includes a back section 41 supporting a parachute 42 and a back rest cushion or lumbar pad 43. The parachute is connected to the crewman's harness at the fittings 25 through the risers 26. Inertia reels (not shown) mounted on the seat back 41 connect the shoulder straps 27 to the seat. Thus, by releasing the fittings 25, the harness and upper torso of the crewman's body are released from the parachute risers 26 and shoulder restraints 27.

The seat bucket or base 44 carries a spacer or cushion which is formed by a survival kit 45 having an upper padded surface. The survival kit 45 is releasably secured to the seat bucket 44 by hold down straps (not shown) and sticker straps 46 releasably secured to the seat bucket 44 engage the survival kit straps 30. The seat base 44 also carries a lap belt 48 and releasable leg restraints 49. The lap belt is releasable both by manually uncoupling its buckle and automatically at its points of connection with the seat structure 44. In the latter regard, the lap belt 48 is secured at each of its ends on the seat bucket 44 by an appropriate release mechanism such as a latch 50. The leg restraints are likewise secured to the seat bucket by releasable latches 51. The lap belt is secured over the lap of the crewman by connecting the inner ends thereof together with an appropriate buckle 52, while the leg restraints 49 include garters and buckles 54 for engaging the calves of the crewman. Additional garters and buckles (not shown) may be included to engage the crewman's thighs.

While the ejection seat includes a variety of other accessories as described in the above-referenced manuals, the foregoing restraint elements are those which, when engaged by the crewman, not only protect him and restrain him during violent maneuvers or deceleration of the aircraft, but also delay or hinder his egress from the cockpit except in the event of the actuation of the ejection seat. Thus, after the crewman has entered the aircraft cockpit and engaged the various restraint devices described above to himself and his parachute harness, he must disengage the restraint devices before he can leave the cockpit.

In the event of an emergency while the aircraft is on the ground, necessitating an immediate evacuation of the aircraft, the present invention embodies a new and improved single point release mechanism, actuation of which substantially instantaneously releases the crewman and his harness from the restraints allowing him to evacuate the cockpit within a few seconds. In accordance with the present invention, means are provided for sequentially actuating the various restraint devices to enable the crewman to leave the aircraft cockpit rapidly in a ground emergency. This actuating means serves to release the leg restraints, causes the canopy riser and shoulder straps to disconnect from the harness, effects a disengagement of the survival kit latches from the harness, and disengages the lap belt from the seat bucket. The present invention accomplishes this with a single point control mechanism mounted on the seat bucket and operable by a crewman sitting on the seat during or after the process of connecting his various restraint devices, or by a rescuer from outside the aircraft. It will be appreciated that it is not necessary that all of the restraint devices be connected as the various release mechanism will be activated regardless of whether or not they have been connected. As a further advantage of the single point release mechanism embodied in the present invention, the same mechanism may be utilized in connection with in-flight emergency ejection and parachute descent procedures as described in the above-referenced flight manuals. In this regard, initial actuation of the seat ejection mechanism by the crewman interdicts the parachute canopy riser and survival kit release mechanism while allowing the actuation of the leg restraint and seat belt and shoulder harness release mechanisms. The latter operation is sometimes necessary in the event the automatic altitude release mechanisms do not operate, requiring the crewman to semi-automatically disengage himself from the ejection seat after ejection and before personnel parachute descent can be initiated.

With reference to the drawings, the single point release mechanism actuator as there shown comprises a mounting plate 60 secured on the right hand outer wall of the seat bucket 44 and carrying a pulley or sheave 61 mounted on a shaft 62 carried by the plate 60. The sheave is biased for rotary movement in a counterclockwise direction by a clock spring 64 which acts to rotate the sheave 61. The sheave is provided with a circumferential channel 65 which carries a cable 66 extending around a substantial portion of the periphery of the sheave, and then upwardly through a guide bracket 68 where it is connected with a flexible rubber pull handle 69 positioned for convenient access by a crewman in the seat 40. By pulling on the handle 69, the cable 66 effects rotation of the sheave 61 in a clockwise direction.

In order to prevent accidental operation of the release mechanism, and to insure that the handle is only intentionally pulled, initial movement of the handle and cable is restricted to require a breakout force which in the present embodiment is approximately in the amount of 30 pounds. To this end, the cable guide housing or bracket 68 defines a chamber 70 in which is rotatably mounted a shaft 71 carrying a double pronged latch dog 72. The dog is biased for rotation in a clockwise direction by a heavy torsion spring 74, and one prong of the dog 75 includes a cam surface 76 engagable by a pin 78 on the peripheral wall of the sheave 61. The torsion spring force, combined with the angle of the cam surface, determine the initial breakout force which must be overcome by the handle in order to pull the pin 78 past the prong 75 of the latch dog to free the sheave for rotation.

When the handle 69 has been pulled with sufficient force to turn the sheave 61 a distance sufficient to allow the pin to clear the first prong 75 of the latch dog, the dog is rotated by the torsion spring 74, in a clockwise direction, to a point where the first prong 75 engages a stop shoulder 79 defined on the latch housing. At that point, the second prong 80 of the latch dog 72 extends downwardly out of the latch housing cavity 70 where it serves as a latch, as will be described below. When the sheave 61 has rotated a distance sufficient for the pin 78 to clear the latch dog, the pulling force required is substantially decreased. Depending on the location of the pin 78 on the sheave, a lost motion arc is provided during which no releases are actuated.

For actuating the various release mechanisms, the sheave shaft 62 rotably supports a bell crank spider 82. In the embodiment shown, the bell crank 82 includes four arms, three of which are coupled to appropriate release actuating linkages, and the fourth of which 84 includes an inturned finger 85 adapted to be engaged by a lug 86 on the sheave after the sheave has rotated through a lost motion arc. The distance between the point at which the pin 78 clears the latch dog 75 and the point where the lug 86 engages the bell crank finger 85 determines the amount of lost motion in the actuating handle 69 and cable 66. This lost motion insures that actuation of the restraint release mechanism is intentional and further prevents unintended or accidental actuation such as, for example, might be caused by stepping on the actuating handle 69.

Referring in more detail to the bell crank 82, one arm 88 thereof is coupled by a one-way push link 89 to one leg 91 of a second bell crank 90. The bell crank 90 is fixed on a shaft 92 which in turn is connected, by an appropriate linkage 94, to the seat belt release latches 50, and the inertia reel strap terminal release, (not shown). A second leg 95 of the bell crank 90 is secured through a link 96 to release latches 51 for releasing the leg restraints from the bucket 44.

For releasing the parachute riser and shoulder restraint disconnect couplings 25 together with the survival kit couplings 29, another arm 99 of the bell crank 82 is coupled to a rapid deflagrating cord firing mechanism 100 by means of a pin 101 on the arm 99 slidingly engaged with a lost motion link 102 which is in turn secured to the end of a firing pin actuating link 104. The main or master rapid deflagrating cord 39 is coupled to the firing mechanism 100 by an appropriate fitting 105 which includes a primer or firing cap 106 located to be struck by a firing pin 108, carried by a spring biased plunger 107. The firing pin is cocked against the force of the spring 109 as the pin 101 lifts the link 102. When the link 102 has been lifted sufficiently to allow a latch 110 to slip away from the firing pin plunger, the firing pin, under the force of the spring 109, stikes the cap 106 and ignites the rapid deflagrating cord. The cord burns rapidly through the master cord 39 to the various fittings and junctions and branch cords 35 and 38 which lead to the various hot gas actuated disconnect devices.

In the event the ejection seat is actuated in the usual manner during an in-flight emergency, either through pulling the ejection seat D-ring in front of the seat or pulling on the face curtain located above the crewman's head, it is essential that the parachute riser disconnect and survival kit disconnect devices be prevented from actuation because of the disastrous consequences ensuing therefrom. To this end, the rapid deflagrating cord firing housing includes an interdict device 112 by means of which an interdict pin 114 is positioned beneath the firing pin body or plunger 107 to prevent the firing pin 108 from hitting the firing cap 106. The interdict device is actuated by a cable 115 secured to a link on the conventional torque tube 116 forming a part of the seat ejection control mechanism. The torque tube is initially rotated by actuation of either the face curtain or the D-ring, and prior to actual ejection. In response to the resultant pull on cable 115, the safety pin 114 is released and driven by a spring 118 into interdicting position with the firing pin 108 and plunger 107.

When the safety pin 114 interdicts the firing pin plunger 107 thereby preventing actuation of the hot gas actuated disconnect devices, the single point system as described can be utilized for manual disengagement of the ejection seat in the event the altitude sensing release mechanism fails to operate. In this mode, it is further necessary that the drogue chute withdrawal line be severed from its connection to the personnel parachute to allow the latter to be activated by a ripcord. Accordingly, a third arm 120 on the bell crank 82 is connected, through a link 121 and bell crank 122, to a guillontine or cutter operating mechanism 124. The guillotine or cutter severs the personnel parachute withdrawal line between the drogue parachutes and the personnel parachute and its pack. The seat occupant then pushes free of the seat and the sticker clips that hold him and his survival kit to the seat, and when free pulls the parachute ripcord and makes a normal parachute descent to the ground.

In either the ground emergency escape mode or the manual seat separation ejection mode, a continued pull on the release mechanism handle 69 to full release position causes the sheave 61 and bell crank 82 to continue to rotate until the arm 99 is engaged by and latches under the second prong 80 of the latch dog 72. When so latched, all of the bell crank linkages are held in the release position as the cable rewinds on the sheave. This insures that the seat belt and leg restraint latches cannot re-engage even though the crewman does not immediately pull himself free of these restraints.

With the foregoing apparatus and system, a single point actuation effects a multiple point release thereby enabling a crewman to free himself of all restraints and escape from the aircraft in the shortest possible time span when confronted by a ground emergency. It will be appreciated that, upon exiting the aircraft with his harness intact, the various oxygen, communication and life support lines which may be coupled to the crewman or his harness are designed to quickly and easily pull free of the seat and aircraft attachments, leaving the man unrestrained by any connection to the seat or aircraft. With the device as described, it is necessary for the crewman to actuate only one mechanism with a single movement. By safetying the mechanism in the event of a seat ejection, the same release movement and mechanism may be simply and effectively utilized in the event of an automatic seat disengagement failure thereby allowing manual actuation of the parachute for a safe descent from an in-flight emergency necessitating ejection.

As an added element of the system, the hot gas rapid deflagrating cords connect to pull away fittings which enable the portions of the cords connected to the parachute risers and survival kit straps to be pulled away from interconnection with the master cord at the point of connection with the seat. An illustrative pull away fitting is shown in the drawings and comprises a fitting body 130 having a central cavity 131 adapted to removably receive a fitting nipple 132. The nipple 132 is held in the fitting body by a detent 134 which, as shown in the drawings, comprises a ball detent member 135 spring biased by a plurality of Belleville springs 136 into a groove 138 formed in the exterior surface of the inserted end of the fitting nipple 132. The body chamber 131 is vented to the atmosphere through a vent 139 in the bottom thereof. A plurality of passages 140 through the body 130 open into the central chamber 131 through an internal annular groove 141 formed in either the external surface of the nipple or the internal surface of the fitting body, but preferably not both. In the modification illustrated, the annular groove is shown as formed in the fitting body. The nipple 132 is formed with a blind axial passage 142 extending partially therethrough and terminating in a plurality of transverse passages 144 which open into the exterior wall of the nipple 132 at a point coinciding with the annular groove 141 in the fitting body. The nipple 132 is further provided with spaced O-ring seals 145 on either side of the transverse passages 144 and the annular groove 141 to prevent the leakage of fluid such as hot gas from the body around the nipple. Both the nipple and the fitting body include appropriate threaded connecting means at the outlet end of the various passages 142 and 140 respectively, by means of which conduits, such as rapid deflagrating cord, may be secured and sealed to the fitting. As shown, the fitting body 130 includes internally threaded counterbores 146 for receiving externally threaded fittings 147 on the rapid deflagrating cord. Similarly, the axial passage 142 of the nipple 132 terminates in an internally threaded counterbore 148 for engagement with an externally threaded fitting 149 on a rapid deflagrating cord or other such conduit. The fitting body further includes appropriate mounting structures, such as an apertured ear 150, by means of which the body can be rotatably mounted on the seat or other structure in order to provide a self-aligning directional pull release. It will be appreciated that the nipple can be readily inserted into or withdrawn from the fitting body, the force required being determined by the detent 134.

While certain illustrative embodiments of the present invention have been shown in the drawings and described in considerable detail, it should be understood that there is no intention to limit the invention to the specific forms disclosed. On the contrary, the intention is to cover all modifications, alternative constructions, equivalents and uses falling within the spirit and scope of the invention as expressed in the appended claims.

We claim:

1. In a restraint divestment system for releasing a crewman equipped with a parachute and restraint harness from an aircraft ejection seat and seat mounted restraint assembly in the event of a ground emergency, wherein said ejection seat is actuated by a seat actuation mechanism, said seat mounted restraint assembly includes means for securing shoulder restraints and parachute canopy risers to said harness, and said seat contains a survival kit releasably mounted as a part thereof and including means for securing said survival kit to said harness, seat lap belt means and leg restraint means for securing the crewman to the seat, and first release means for releasing said seat belt means and said leg restraint means from restraining the crewman with respect to the seat;

the improvement comprising, in combination, a second release means for substantially simultaneously releasing from said harness said parachute canopy risers, said shoulder restraint securing means and said survival kit securing means;

and single point operating means mounted on said ejection seat and operable by the crewman for sequentially actuating said first and second release means to release the seat and harness engaged restraints without divesting the harness from the crewman, whereby in the event of a ground emergency the crewman can escape from the aircraft with his harness intact and free of seat and harness restraints.

2. The restraint divestment system defined in claim 1 wherein the improvement further includes a safety interlock means between the ejection seat actuator mechanism and said second mentioned release means to prevent operation of said second mentioned release means to prevent operation thereof in the event of an attempted ejection of the seat from the aircraft.

3. The restraint divestment system defined in claim 1 wherein said second mentioned release means includes hot gas means actuated by said single point operated means for effecting the release from said harness of said parachute and shoulder restraint securing means and said survival kit securing means.

4. The restraint divestment system defined in claim 1 wherein said means for securing shoulder restraints and parachute canopy risers to said harness and the means for securing the survival kit to said harness include reconnectable remotely actuable disconnect means forming a part of said second mentioned release means.

5. The restraint divestment system defined in claim 1 wherein said crewman operated means includes a bell crank, a pull cord, means interconnecting said pull cord and said bell crank for rotating said bell crank about a pivot point upon actuation of the pull cord by the crewman, and means interconnecting said bell crank with said release means.

6. The restraint divestment system defined in claim 1 wherein said single point means comprises a rotary rewind spring biased cable driven sheave having a pull cable secured thereto and terminating in a pull handle, a stiffly releasable detent means engaging said sheave for initially restraining said sheave against unintended rotation, a rotatable multi-armed bell crank mounted for coaxial rotation with respect to said sheave, lug means on said sheave for operative driving engagement with said bell crank after partial rotation of said sheave, link means operatively coupling said bell crank arms to selected units of the system to be actuated as said bell crank is turned by said cable driven sheave, and said detent means engaging and locking said bell crank to positively hold said bell crank in its fully rotated position upon completion of the pull on and subsequent release of the pull handle.

7. In a restraint divestment system for releasing a crewman equipped with a parachute and restraint harness from an aircraft ejection seat mounted restraint assembly in the event of a ground emergency, wherein said seat mounted restraint assembly includes means for securing shoulder restraints and parachute canopy risers and a seat mounted survival kit to said harness, the improvement comprising: hot gas actuated means for releasing said securing means, system actuating means mounted on the ejection seat, and hot gas rapid deflagrating cord interconnecting said system actuating means and said hot gas actuated releasing means, said hot gas rapid deflagrating cord being connected to the system actuating means on the ejection seat by a pull away swivel fitting comprising a fitting body having a passage therethrough opening into a central chamber, a nipple insertable into said chamber and having an axial passage extending partially therethrough and opening into communication with said body passage through a plurality of transverse passages, O-ring seal means for sealing said nipple within said body chamber, and releasable detent means on said body engageable with an inserted end of said nipple for releasably restraining said nipple in said body with said transverse passages in communication with said body passage, said rapid deflagrating cord being adapted for producing hot gas for substantially simultaneously releasing said securing means upon the operation of said system actuating means thereby to release said survival kit, shoulder restraints and parachute canopy risers from the restraining harness without releasing said restraining harness from the crewman.

8. The restraint divestment system defined in claim 7 including interlock means between said aircraft ejection seat and said releasing means for preventing operation of said releasing means in the event of the attempted ejection of said seat from said aircraft.

9. The restraint divestment system defined in claim 7 wherein said system actuating means comprises a bell crank, a pull cord, means operatively coupling said pull cord and said bell crank for rotating said bell crank about a pivot point upon actuation of the pull cord by the crewman, and means coupling said bell crank with said interconnecting means for actuation of the latter in response to the operation of the pull cord.

10. The restraint divestment system defined in claim 9 wherein said means coupling said bell crank with said interconnecting means includes a lost motion connection.

11. In a restraint divestment system for releasing a crewman equipped with a parachute and restraint harness from an aircraft ejection seat mounted restraint assembly in the event of a ground emergency, wherein said seat mounted restraint assembly includes means for securing shoulder restraints and parachute canopy risers and a seat mounted survival kit to said harness, the improvement comprising: hot gas actuated means for releasing said securing means, system actuating means mounted on the ejection seat, hot gas rapid deflagrating cord interconnecting said system actuating means and said hot gas actuated releasing means, and means releasably interconnecting said hot gas rapid deflagrating cord and said system actuating means, said rapid deflagrating cord being adapted for producing hot gas for substantially simultaneously releasing said securing means upon the operation of said system actuating means thereby to release said survival kit, shoulder restraints and parachute canopy risers from the restraining harness without releasing said restraining harness from the crewman.

12. The restraint divestment system defined in claim 11 wherein said means releasably interconnecting said hot gas rapid deflagrating cord and said system actuating means comprises pull away swivel fitting comprising a fitting body mounted on the ejection seat and having a passage therethrough opening into a central chamber, a nipple insertable into said chamber and having an axial passage extending partially therethrough and opening into communication with said body passage through a plurality of transverse passages, O-ring seal means for sealing said nipple within said body chamber, and releasable detent means on said body engagable with an inserted end of said nipple for releasably restraining said nipple in said body with said transverse passages in communication with said body passage.

* * * * *